(12) United States Patent
Rediger

(10) Patent No.: US 9,777,211 B2
(45) Date of Patent: *Oct. 3, 2017

(54) PROPPANTS FOR USE IN HYDRAULIC FRACTURING OF SUBTERRANEAN FORMATIONS

(71) Applicant: Georgia-Pacific Chemicals LLC, Atlanta, GA (US)

(72) Inventor: Richard A. Rediger, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,642

(22) Filed: Jun. 1, 2015

(65) Prior Publication Data

US 2015/0275072 A1    Oct. 1, 2015

Related U.S. Application Data

(63) Continuation of application No. 13/087,709, filed on Apr. 15, 2011, now Pat. No. 9,045,678.

(60) Provisional application No. 61/345,207, filed on May 17, 2010.

(51) Int. Cl.
    *C09K 8/80* (2006.01)

(52) U.S. Cl.
    CPC .................... *C09K 8/805* (2013.01)

(58) Field of Classification Search
    CPC .......... C09K 8/524; C09K 8/54; C09K 8/805; C09K 2208/10; C09K 8/38; C09K 2208/22; C09K 8/52; C09K 8/68; C09K 2208/08; C09K 2208/24; C09K 2208/32; C09K 8/04; C09K 8/36; C09K 8/426; C09K 8/467; C09K 8/487; C09K 8/516; C09K 8/685; C09K 8/80; E21B 47/00; E21B 43/26; E21B 43/267; E21B 43/263; E21B 47/14
    See application file for complete search history.

(56) References Cited

U.S. PATENT DOCUMENTS

| | | | |
|---|---|---|---|
| 3,522,092 A * | 7/1970 | Cortis-Jones | C13B 50/002 127/30 |
| 3,929,191 A | 12/1975 | Graham et al. | |
| 3,942,147 A | 3/1976 | Josephson | |
| 4,171,381 A | 10/1979 | Chiu | |
| 4,518,039 A | 5/1985 | Graham et al. | |
| 4,581,253 A * | 4/1986 | Evans | C09K 8/805 166/280.2 |
| 4,585,064 A | 4/1986 | Graham et al. | |
| 4,732,920 A | 3/1988 | Graham et al. | |
| 5,318,990 A | 6/1994 | Strauss | |
| 5,661,213 A | 8/1997 | Arkens et al. | |
| 5,837,656 A | 11/1998 | Sinclair et al. | |
| 5,948,734 A | 9/1999 | Sinclair et al. | |
| 5,955,144 A * | 9/1999 | Sinclair | C09K 8/805 427/214 |
| 6,136,916 A | 10/2000 | Arkens et al. | |
| 6,331,350 B1 | 12/2001 | Taylor et al. | |
| 6,528,157 B1 | 3/2003 | Hussain et al. | |
| 9,045,678 B2 * | 6/2015 | Rediger | C09K 8/805 |
| 2005/0227874 A1 | 10/2005 | Berger et al. | |
| 2007/0027283 A1 * | 2/2007 | Swift | C07H 5/04 527/312 |
| 2008/0026108 A1 | 1/2008 | Subramanian | |
| 2008/0202750 A1 * | 8/2008 | Rediger | C09K 8/805 166/280.2 |
| 2009/0301972 A1 | 12/2009 | Hines et al. | |
| 2009/0324915 A1 * | 12/2009 | Swift | C03C 25/26 428/219 |

FOREIGN PATENT DOCUMENTS

| | | | |
|---|---|---|---|
| CN | 101637298 | | 2/2010 |
| WO | 2008/089847 A1 | | 7/2008 |
| WO | WO2008/091256 | * | 7/2008 |
| WO | WO2008/127936 | * | 10/2008 |

OTHER PUBLICATIONS

International Search Report and Written Opinion of the International Search Authority, dated Dec. 13, 2011.

* cited by examiner

*Primary Examiner* — Kumar R Bhushan
(74) *Attorney, Agent, or Firm* — Ram W. Sabnis

(57) ABSTRACT

A proppant for a well treatment fluid includes discrete particles of a substrate, such as sand, coated with a resin comprising a product of the Maillard reaction between a carbohydrate and an amine and/or an ammonium compound. Different resins, in particular thermoplastic or thermosetting resins, may be blended with Maillard reaction products or applied to the substrate as separate layers. The proppant may be included in a fracturing fluid, which is injected into a subterranean formation and used to stimulate hydrocarbon production from the subterranean formation.

15 Claims, No Drawings

PROPPANTS FOR USE IN HYDRAULIC FRACTURING OF SUBTERRANEAN FORMATIONS

CROSS-REFERENCE TO RELATED APPLICATION

This application is a continuation of co-pending U.S. patent application Ser. No. 13/087,709, filed on Apr. 15, 2011, which claims priority to U.S. Provisional Patent Application No. 61/345,207, filed on May 17, 2010, which are both incorporated by reference herein.

FIELD OF THE INVENTION

This invention relates to proppants for use in hydraulic fracturing of subterranean formations.

BACKGROUND

Hydraulic fracturing is a term that has been applied to a variety of methods used to stimulate the production of fluids such as oil, natural gas, from subterranean formations. In hydraulic fracturing, a fracturing fluid, usually an aqueous fluid, is injected through a well bore and against the face of the formation at a pressure and flow rate at least sufficient to overcome the overburden pressure and to initiate and/or extend a fracture(s) into the formation. The fracturing fluid usually carries a proppant such as sand, bauxite, glass beads, etc., suspended in the fracturing fluid and transported into a fracture. The proppant keeps the formation from closing back down upon itself when the pressure is released. The proppant filled fractures provide permeable channels through which the formation fluids can flow to the well bore and thereafter be withdrawn.

In hydraulic fracturing, proppant particles under high closure stress tend to fragment and disintegrate. For example, at closure stresses above about 5000 psi (34,500 kPa), silica sand, the most common proppant, is not normally employed due to its propensity to disintegrate. The resulting fines from this disintegration migrate and plug the interstitial flow passages in the propped formation. These migratory fines drastically reduce the permeability of the propped fracture.

Other propping agents have been used in an attempt to address this problem. Organic materials, such as the shells of walnuts, coconuts and pecans have been used with some success. These organic materials are deformed rather than crushed when a fracture closes under the overburden load. Aluminum propping agents are another type of propping agent that deform rather than fail under loading. While propping agents such as these avoid the problem of creating fines, they suffer the infirmity of allowing the propped fracture to close as the proppant is squeezed flatter and flatter with time. In addition, as these particles are squeezed flat the spaces between the particles grow smaller. This combination of decreased fracture width and decreased space between the particles results in reduced flow capacities.

Another type of proppant includes spherical pellets of high strength glass. These high strength glass proppants are vitreous, rigid and have a high compressive strength which allows them to withstand overburden pressures of moderate magnitude. In addition, their uniform spherical shape aids in placing the particles and providing maximum flow through the fracture. While these beads have a high strength when employed in monolayers, they are less satisfactory in multilayer packs. In brine at 250° F. (121° C.), the high strength glass beads have a tendency to disintegrate at stress levels between 5000 psi (34,500 kPa) and 6000 psi (41,400 kPa) with a resultant permeability which is no better, if not worse than sand under comparable conditions.

Resin coated particles have been used in efforts to improve the stability of proppants at high closure stresses. For example, U.S. Pat. No. 3,492,147 describes proppants useful in fracturing operations in which the proppants are produced by coating a particulate solid with an infusible resin. The particulates to be coated include sand, nut shells, glass beads and aluminum pellets, whereas the resins used include urea-aldehyde resins, phenol-aldehyde resins, epoxy resins, furfuryl alcohol resins and polyester or alkyd resins.

Although resin coated particles have proven satisfactory in numerous applications, concern exists over their use under high closure stresses. For example, some self-consolidating, resin-coated particles of the prior art do not develop their full strength until the resin coating has cured in the formation. In the event of rapid closure of the fracture, the proppant could be crushed before the resin has cured, resulting in decreased permeability. The use of dual resin coated particles as described in U.S. Pat. No. 4,585,064 has therefore been proposed as a way to alleviate this problem. In particular, in the '064 patent the proppant substrate is provided with an inner coating of a substantially cured resin to increase the crush resistance of said substrate and an outer coating of a fusible curable resin which fuses and cures when injected into a formation to create a cohesive permeable mass.

One concern with the use of self-consolidating, resin-coated particles is compatibility with the well treatment fluids used to transport such particles into a formation. To address this concern, U.S. Pat. No. 5,837,656 discloses a dual resin coated proppant that combines the well treatment fluid compatibility advantages of precured resin coated particles with the strength and resistance to migration of self-consolidating proppants. The proppant comprises a particulate substrate coated with an inner coating of a fusible curable resin; and an outer coating of a substantially heat-cured resin, where the resin of the inner coating is selected from the group consisting of phenol-aldehyde resins, urea-aldehyde resins, melamine-aldehyde resins, epoxy resins, furfuryl alcohol resins, and copolymers of such resins; the resin of the outer coating is selected from the group consisting of phenol-aldehyde resins, urea-aldehyde resins, melamine-aldehyde resins, epoxy resins, furfuryl alcohol resins, and copolymers of such resins, and the resin of the outer coating is heat-curable at conditions that leave the resin of the inner coating uncured.

Although resin coated particles offer significant advantages as proppants for well treatment fluids, the resins currently employed are generally derived from petroleum making them subject to the same supply constraints and price increases as their base raw material. In addition, many of the current resins, such as the phenolic resins, contain impurities, such as free phenol and/or free formaldehyde, which can negatively interact with the fracturing fluid used to suspend the coated proppant as it is being pumped into a formation. Furthermore, it has been shown that non-reacted hexamethylenetetramine, which is commonly used to cure or partially cure the novoalc phenolics, can also leach out and negatively impact the fracturing fluids as well.

U.S. Patent Application Publication No. 2008/0202750, published Aug. 28, 2008, discloses thermoplastic coated proppants. These thermoplastic coated proppants are both free-flowing and not tacky at ambient conditions. However, at elevated temperatures and pressures often encountered in subterranean formations, the coated proppants exhibit latent tackiness which results in the agglomeration of the coated proppants to form a stable framework of agglomerated proppant particles. Such a stable framework or network of agglomerated proppant particles reduces both solid particle flow-back and the transport of formation fines from the subterranean formation. Examples of thermoplastic materials, which may be used to coat proppants, include polyethylene, a polypropylene, an ethylene vinyl acetate, an ethylene ethyl acrylate, a styrene-isoprene-styrene, an acrylonitrile-butadiene-styrene, a styrene-butadiene-styrene, a polystyrene, a polyurethane, an acrylic polymer, a polyvinyl chloride, a fluoroplastic, a polysulfide, a styrene-acrylonitrile, a nylon, a phenol-formaldehyde novolac resin, or any combination thereof. In another aspect, the thermoplastic material is a pine rosin, a modified rosin, a rosin ester, or any combination thereof. Further examples of such thermoplastic materials include a terpene resin, a coumarone-indene resin, an oligomer of $C_5$ hydrocarbons, an oligomer of $C_9$ hydrocarbons, an oligomeric reaction product of a terpene and a phenolic, an oligomeric reaction product of a terpene and a styrenic, or combinations thereof. Generally, the number-average molecular weight of these oligomeric materials is less than about 10,000, and more often, less than about 5000. The number-average molecular weight of the terpene resin, the coumarone-indene resin, the oligomer of $C_5$ hydrocarbons, the oligomer of $C_9$ hydrocarbons, the oligomeric reaction product of a terpene and a phenolic, and the oligomeric reaction product of a terpene and a styrenic, may be within a range from about 100 to about 4000. The number-average molecular weight of these materials may be in a range from about 125 to about 3000, from about 150 to about 2000, or from about 200 to about 1000.

According to the present invention, it has now been found that a resin system obtained as a product of the Maillard reaction between a carbohydrate and an amine or an ammonium compound provides an effective and advantageous coating for proppant particles. This invention may be used as a single layer to enhance crush resistance and especially when used as the outer cured coating of multi-coated proppant particles, such as described in U.S. Pat. No. 5,837,656. Thus, not only is the resin system derived from renewable biological resources, but also the system does not contain the free phenol and/or free formaldehyde that can degrade many fracturing fluids.

U.S. Patent Application Publication No. 2007/0027283, published Feb. 1, 2007, discloses a binder, comprising: Maillard reactants including (i) an amine and (ii) a carbohydrate, wherein the binder is (i) uncured and (ii) formaldehyde free. However, the binder is used to fabricate materials from non or loosely assembled matter, such as glass or cellulose fibers. A similar binder for wood particles is disclosed in International Patent Publication No. WO 2008089847.

SUMMARY

A proppant for a well treatment fluid comprises discrete particles of a substrate coated with a resin comprising a product of the Maillard reaction between a carbohydrate and an amine and/or an ammonium compound. The carbohydrate may be a monosaccharide, such as a reducing sugar. The reducing sugar may be at least one of dextrose, xylose, fructose, and dihydroxyacetone. The Maillard reaction may be between a carbohydrate and an ammonium salt of a carboxylic acid, which may be a polycarboxylic acid, such as citric acid.

The coating comprising the Maillard reaction product may be the only coating on the substrate. This coating may be composed entirely or essentially of the Maillard reaction product or it may be a blend of the Maillard reaction product with other polymers. The coating comprising the Maillard reaction product may be coated as a layer on the substrate. Other layers composed of a variety of materials may also be coated on the substrate. These other layers may be underneath or above a layer formed by coating with the product of the Maillard reaction.

In one embodiment, a substrate is first coated with an innermost layer of a fusible resin and then with an outermost layer comprising a product of the Maillard reaction product. The fusible resin may be a thermoplastic resin or a thermosetting resin.

Examples of thermoplastic resins are described in U.S. Patent Application Publication No. 2008/0202750, published Aug. 28, 2008, and include an ethylene vinyl acetate, a phenol-formaldehyde novolac resin, a pine rosin, a modified rosin, a rosin ester, a terpene resin, a coumarone-indene resin, an oligomer of $C_5$ hydrocarbons, an oligomer of $C_9$ hydrocarbons, an oligomeric reaction product of a terpene and a phenolic, and an oligomeric reaction product of a terpene and a styrenic, or any combination thereof.

Examples of thermosetting resins are described in U.S. Pat. No. 5,837,656 and include phenol-aldehyde resins, urea-aldehyde resins, melamine-aldehyde resins, epoxy resins, furfuryl alcohol resins, and copolymers of such resins.

Examples of substrate particles include sand, glass beads, ceramics, carbon particles, bauxite, crushed nut (e.g., walnut or pecan) hulls, and other natural fibers, and man made polymeric particles, such as particles of cured polyesters and phenolics.

The proppants may be included in a fracturing fluid, which is injected into a subterranean formation and used to stimulate hydrocarbon production from the subterranean formation.

DETAILED DESCRIPTION

Embodiments of the present invention combine the well treatment fluid compatibility advantages of precured resin coated particle with the strength and resistance to migration of self-consolidating proppants. This combination of properties may be achieved by creating a particle with a thin cured resin coating that is compatible with fracturing fluids, yet still consolidates into a strong permeable mass when subjected to downhole conditions.

Substrate

The present invention can be carried out with any suitable substrate. Choice of the particulate substrate is governed by the properties required by the particular application. One advantage of the invention is that conventional frac sand can be rendered superior to the more expensive manufactured proppants, particularly in terms of their ability to withstand crushing forces and to avoid subsequent fines generation.

For example, in the oil and gas industry extremely high strength proppants are needed to hold open formation fractures created by hydraulic fracturing. In such an application, the present invention may use spherical glass beads as the particulate substrate. Such beads are available commercially in a variety of mesh sizes. For example, Union Carbide Corporation supplies vitreous, rigid, inert, substantially spherical pellets under the trade name UCAR props. Such beads, while of extremely high strength when employed in monolayers are less satisfactory when placed in multilayer packs. These beads when resin coated by the process of this invention and then cured in place yield a permeable mass of higher compressive strength than the beads alone. Beads from about 6 to about 200 mesh are generally used. In extreme environments where stresses are very high, sintered bauxite, aluminum oxide, and ceramics such as zirconium oxide and other mineral particulates may be coated. Particles from 6 to 100 mesh are generally used. (All reference to mesh size in the claims and specification are to the U.S. standard sieve series).

Also suitable for use as substrates are various organic materials such as walnut and pecan shells, synthetic polymers such as nylon, polyethylene and other resin particles. Metallic particles such as steel and aluminum pellets can also be coated.

Conventional frac sand is a preferred particulate substrate of the invention. Silica sand of about 6 to 100 mesh (U.S. standard sieve) is generally used. One of the principal advantages of the instant invention is that frac sand coated by the method of this invention is as strong or stronger than the more expensive proppants described above. Just as importantly, in conditions where extreme stresses are expected the usable range of such high stress proppants as bauxite and the other ceramics can be extended by following the teachings of this invention. The utility of conventional frac sand can be extended into high stress applications by first coating the sand with a cured coating. This resin coated sand may then be used as a substrate and at least one additional resin coat may be applied as described below. Such coated particles may exhibit the enhanced properties of dual-coated proppants described in U.S. Pat. No. 4,585,064, and the frac fluid compatibility of the instant invention.

The type of sand used as a proppant substrate may come in a variety of shapes and sizes. This sand may be relatively rounded or have spherical grains or the sand may be an angular sand having sharp or less rounded grains. Similarly, particulate substrates other than sand, such as ceramics, may be essentially spherical with rounded edges or angular with sharp or jagged (not soft or rounded) edges.

Resins

In addition to Maillard reaction products, resins suitable for proppant coatings include thermoplastic resins and thermosetting resins. These thermoplastic resins and thermosetting resins may be blended with Maillard reaction products or applied as separate coatings on a substrate.

The thermoplastic resins may have latent tackiness, such that the coated substrates are both free-flowing and not tacky at ambient conditions. However, at elevated temperatures and pressures often encountered in subterranean formations, the thermoplastic coated substrates exhibit latent tackiness which results in the agglomeration of the coated substrates to form a stable framework of agglomerated proppant. Examples of thermoplastic resins are described in U.S. Patent Application Publication No. 2008/0202750 and include pine rosins and chemically modified pine rosins.

Thermosetting resins are capable of being coated on the substrate and then being cured to a higher degree of polymerization. Examples of such thermosetting resins are described in U.S. Pat. No. 5,837,656 and include phenol-aldehyde resins of both the resole and novolac type, urea-aldehyde resins, melamine-aldehyde resins, epoxy resins and furfuryl alcohol resins and copolymers of such resins. The resins preferably form a solid non-tacky coating at ambient temperatures. This is desired so that the coated particles remain free flowing and so that they do not agglomerate under normal storage conditions.

The phenol-formaldehyde resins for coating substrates include true thermosetting phenolic resins of the resole type and phenolic novolac resins which may be rendered heat reactive by the addition of catalyst and formaldehyde. Such resins may have softening points of 185° F. (85° C.) to 290° F. (143° C.).

A resin for coating a substrate may have both thermosetting and thermoplastic properties. Such resins may be prepared by blending one or more suitable thermosetting resins with one or more thermoplastic resins. In such blends, the thermosetting resin may be in an uncured, partially cured or totally cured state.

A coupling agent may be incorporated during manufacture of the resin that is to be used as a substrate coating. The coupling agent may have at least one functional group to promote binding of the resin to the substrate, to promote binding of an outer coating layer to an inner coating layer, or to promote dispersion of a coated particle in a fluid to be injected into a formation to promote fracturing and propping. The coupling agent may be added in an amount ranging from about 0.1 to 10% by weight of the resin. A preferred range may be from about 0.1 to 3% by weight of the resin.

Substrates Coated with a Single Resin Coat

A substrate may be coated with a Maillard reaction product. The coating allows the particle to withstand higher closure pressures before crushing and fines generation. Also the nature of the coating made from the Maillard reaction product contains no hexamethylenetetramine which is often used to cure a phenolic coating. Thus, the cured Maillard reaction product coated particles exhibit less negative frac fluid interactions and exemplifies the embodiment of this invention.

The substrate may be coated with Maillard reactants in an essentially uncured or partially cured state. The Maillard reactants would be sufficiently solid and non-tacky at ambient conditions to provide a coated substrate, which is free flowing. However, at higher temperatures, such as those present in a subterranean formation, the Maillard reactants would fuse with Maillard reactants from adjacent coated substrates and would intermingle and cure (e.g., with cross-linking) to form an agglomerated mass of proppant.

Substrates Coated with Multiple Resin Coats

Substrates may be provided with two or more coatings. In one such embodiment, the substrate may be first provided with an inner coating of an uncured fusible (e.g., thermoplastic or thermosetting) resin and then with an outermost second coating of a resin formed from a Maillard reaction. After Maillard reactants are coated over the thermosetting resin, these Maillard reactants may be cured or partially cured to harden the outer coating. The temperature used in this curing step should be insufficient to promote curing of the thermosetting resin in the inner layer. This dual coated substrate may be used in the manner described in the above-mentioned U.S. Pat. No. 5,837,656, whereby, due to temperatures and pressures encountered in the formation, the resin of the inner coating flows through the crushed or fractured outer resin layer to the exterior of the coated substrate and then cures to form an agglomerated mass of proppant particles in the formation.

In another embodiment of a dual coated substrate, the substrate is first provided with an inner coating of a thermoplastic resin and then with an outermost second coating of a resin formed from a Maillard reaction. This dual coated substrate may be used in the manner described in the above-mentioned U.S. Patent Application Publication No. 2008/0202750, whereby, due to temperatures and pressures encountered in the formation, the resin of the inner coating flows through the crushed or fractured outer resin layer to the exterior of the coated substrate and binds with other coated substrates to form an agglomerated mass of proppant particles in the formation.

Whenever a coating is applied to a substrate, the coating may encapsulate individual substrate particles and have an essentially uniform thickness. However, the coating need not necessarily totally encapsulate individual substrate particles, and the coatings need not be of uniform thickness. As long as the particles are coated to the extent that the coating provides desirable properties, such as enhanced compatibility with fracturing fluid, the particles need not be entirely encapsulated with any coating material. For example, partially coated particles may be non-tacky and flowable under ambient conditions, yet retain latent tackiness, such that they form agglomerated masses of particles in the formation. The surface of such partially encapsulated may include bare spots, where part of the surface of the substrate is exposed. Coated substrates may also be combined with uncoated substrates or with substrates coated in a different manner.

The coated substrates may be discrete, that is, substantially not agglomerated under ambient conditions. However, small amounts, for example, less than 5% by weight, based on the entire weight of the coated particles, of agglomerated particles may be included, where, for example, up to five substrate particles are bound together by a coating material. The weight of each coating on a substrate particle may be, for example, from about 1 wt % to about 8 wt %, based on the entire weight of the coated particle. The coating thickness of each coating on a substrate particle may be, on average, from about 0.1 to about 5 mils.

Inner Resin Coat

A preferred thermosetting resin of the inner coating to be used in embodiments described herein is a phenolic novolac resin. Particularly suitable are phenolic novolac resins manufactured by Georgia Pacific Chemicals LLC, known as GP-2202 and GP-664G26. The GP-099N07 and GP-664G26 resins have a softening point range of 85-100° C. (185-212° F.). When either resin is used, it is necessary to add to the mixture a cross-linking agent to effect the subsequent curing of the resin. Hexamethylenetetramine is the preferred material for this function as it serves as both a catalyst and a source of formaldehyde, although other cross linking agents may be utilized as well, such as epoxies, and resoles.

A preferred thermoplastic resin of the inner coating in embodiments described herein is a pine rosin, a modified rosin, a rosin ester, or any combination thereof.

Additives and process steps to minimize storage and handling problems have been described. For example, U.S. Pat. No. 4,732,920, to Graham and Sinclair, describes the addition of calcium stearate to prevent sintering and mineral oil to prevent dust problems. Other additives may be used.

A coupling agent may be employed. The choice of coupling agent is influenced by the resin to be used. For phenolic resins, the coupling agents include amino, epoxy, and ureido organo silanes. Epoxy modified gamma-glycidoxypropyltrimethoxysilane has given excellent results when used in the amount of 0.50-1.00% based on the weight of the resin. The use of coupling agents as incorporated into the resin and as applied directly to the particulate substrate is discussed in Graham et al U.S. Pat. No. 4,518,039.

Outer Resin Coat

A Maillard reaction product may be used to form the outermost coating of resin on the substrate. The outer coat of resin may be formed from a heat curable resin coating formed over a coating of as inner heat curable resin. As stated previously, this outer resin may be curable at conditions that do not completely cure an inner curable coating.

As noted above, the outer coat of resin may also be entirely composed of or partially composed of a thermoplastic resin.

Coating Process Parameters

The inner and outer resin coatings may be formed by a variety of methods. For example, the solvent coating process described in U.S. Pat. No. 3,929,191, to Graham et al., may be used. Other processes such as that described in U.S. Pat. No. 3,492,147 to Young et al. describes the coating of a particulate substrate with a liquid, uncatalyzed resin composition characterized by its ability to extract a catalyst or curing agent from a non-aqueous solution. Phenol-formaldehyde novolac resins for the inner coat may be applied to the substrate using a hot melt coating procedure. Such a procedure is described in U.S. Pat. No. 4,585,064. A spray drying procedure may also be used to coat particles.

High strength particles of the invention may be manufactured in a multi-step process. In a first step, a curable resin, such as a phenol-formaldehyde resin or a thermoplastic, such as a pine oil resin, is coated on the particulate substrate. In the second step an outer coating is formed. When the inner resin is a thermosetting resin, the outer coating may be cured at conditions that leave the inner resin curable.

Formation of a Curable Inner Coating

The first or inner coating of resin may be formed on the particulate substrate by first coating the heated substrate with a thermoplastic phenol-formaldehyde novolac resin. This is followed by the addition of a cross linker such as hexamethylenetetramine in an amount (10 to 15% based on resin weight) which will convert the resin coating form thermoplastic to thermosetting. The subsequest coating additions are such that this first coating does not achieve full thermoset cure. This coating may be carried out by preheating the particulate substrate to a temperature above the melting point of the particular resin used.

The particulate substrate may be heated to 350° to 500° F. (177° to 260° C.) prior to resin addition. The heated substrate may be charged to a mixer or muller where from about 1% to about 6%, by weight of substrate, resin may be added. A preferred amount of resin based on the weight of substrate is about 2% to 3%.

After completion of addition of the resin to the substrate, the substrate and melted resin are allowed to mix in the muller for a time sufficient to insure the formation of a uniform coating of resin on the substrate (e.g., sand), for example, from about 20 to about 45 seconds.

Following this mixing step from about 8% to about 15%, by weight of the resin, of a cross-linking agent, such as hexamethylenetetramine, may be added to the substrate resin mixture. The amount of hexamethylenetetramine may be about 13% by weight of the resin. After addition of the hexamethylenetetramine the entire mixture may be allowed to mull for approximately 10 to 15 seconds. Then water may be added to quench the reaction of the inner resin coating. The amount of water added and the timing of its addition may be adjusted to quench the curing of the inner resin while maintaining sufficient heat in the proppant to cure the outer coating that is added next. In place of the cooling water, a heat curable liquid resin, a resole for example, may be added at this stage.

Formation of a Cured Outer Coating

A cured or substantially cured outer resin may then be coated over the inner resin. Substantially cured, as used herein, is to be interpreted as meaning that the cross-linking reaction of the resin is substantially complete and that at typical downhole temperatures only minimal additional curing takes place. The outer resin in a partially, yet substantially cured state, should provide a coating which substantially contains the inner coating and renders the coated substrate in a free flowing state where the particles do not stick together prior to being placed downhole.

Precise control of the heat and mass balance is needed to ensure that a cured outer coating layer sufficiently encapsulates a still curable inner resin coating. One skilled in the art will recognize that batch size, equipment used, and resins and substrate selected will affect process conditions. Initial process temperature, process intervals, amounts of quench water added and amounts of solvent are all interrelated and may be manipulated to arrive at an optimal process. Although experimentation may be required, optimization is within the level of skill in the art once the inventive concept is understood. This type of coating is exemplified in U.S. Pat. No. 5,837,656.

The Maillard Reaction

At least one coating on substrates described herein includes a product of a Maillard reaction. Maillard reactions produce melanoidins, i.e., high molecular weight, furan ring and nitrogen-containing polymers that vary in structure depending on the reactants and conditions of their preparation. Melanoidins display a C:N ratio, degree of unsaturation, and chemical aromaticity that increase with temperature and time of heating. Accordingly, the subject coatings may be made via a Maillard reaction and thus contain melanoidins. It should be appreciated that the subject coatings may contain melanoidins, or other Maillard reaction products. The melanoidins in the coating may be water-insoluble. The Maillard reaction, Maillard reactants, melanoidins, and Maillard reaction products are described in the above-mentioned U.S. Patent Application Publication No. 2007/0027283.

The Maillard reactants to produce a melanoidin may include an amine reactant reacted with a reducing-sugar carbohydrate reactant. For example, in one variation, an ammonium salt of a carboxylic acid may be reacted with (i) a monosaccharide in its aldose or ketose form or (ii) a polysaccharide or (iii) with combinations thereof. The carboxylic acid may be, for example, a monomeric polycarboxylic acid, and the reaction mixture may, optionally, include a polyol. In another particular variation, an ammonium salt of a polymeric polycarboxylic acid may be contacted with (i) a monosaccharide in its aldose or ketose form or (ii) a polysaccharide, or (iii) with combinations thereof. In yet another particular variation, an amino acid may be contacted with (i) a monosaccharide in its aldose or ketose form, or (ii) with a polysaccharide or (iii) with combinations thereof. Furthermore, a peptide may be contacted with (i) a monosaccharide in its aldose or ketose form or (ii) with a polysaccharide or (iii) with combinations thereof. Moreover, a protein may be contacted with (i) a monosaccharide in its aldose or ketose form or (ii) with a polysaccharide or (iii) with combinations thereof. The Maillard reactants may contain protein or peptide or these reactants may be free of protein or peptide.

An outer coating on a substrate may include melanoidins produced in non-sugar variants of Maillard reactions. In these reactions an amine reactant is contacted with a non-carbohydrate carbonyl reactant. In one illustrative variation, an ammonium salt of a monomeric carboxylic acid is contacted with a non-carbohydrate carbonyl reactant such as, pyruvaldehyde, acetaldehyde, crotonaldehyde, 2-furaldehyde, quinone, ascorbic acid, or the like, or with combinations thereof. In another variation, an ammonium salt of a polymeric polycarboxylic acid may be contacted with a non-carbohydrate carbonyl reactant such as, pyruvaldehyde, acetaldehyde, crotonaldehyde, 2-furaldehyde, quinone, ascorbic acid, or the like, or with combinations thereof. In yet another illustrative variation, an amino acid may be contacted with a non-carbohydrate carbonyl reactant such as, pyruvaldehyde, acetaldehyde, crotonaldehyde, 2-furaldehyde, quinone, ascorbic acid, or the like, or with combinations thereof. In another illustrative variation, a peptide may be contacted with a non-carbohydrate carbonyl reactant such as, pyruvaldehyde, acetaldehyde, crotonaldehyde, 2-furaldehyde, quinone, ascorbic acid, or the like, or with combinations thereof. In still another illustrative variation, a protein may contacted with a non-carbohydrate carbonyl reactant such as, pyruvaldehyde, acetaldehyde, crotonaldehyde, 2-furaldehyde, quinone, ascorbic acid, and the like, or with combinations thereof.

The melanoidins discussed herein may be generated from melanoidin reactant compounds. These reactant compounds may be disposed in an aqueous solution at an alkaline pH and therefore may not be corrosive. That is, the alkaline solution prevents or inhibits the eating or wearing away of a substance, such as metal, caused by chemical decomposition brought about by, for example, an acid. The reactant compounds may include a reducing-sugar carbohydrate reactant and an amine reactant. In addition, the reactant compounds may include a non-carbohydrate carbonyl reactant and an amine reactant.

The Maillard reactants may be applied in an uncured or partially cured state to a substrate, which is uncoated or has been precoated with a curable (i.e. thermosetting) or thermoplastic inner coating. For example, the Maillard reactants may be combined at room temperature in a solvent and maintained at room temperature with mixing until the reactants are properly mixed. The liquid mixture of reactants and solvent may then be applied to a substrate precoated with a curable inner coating, followed by heating to induce substantial curing of the outer coating, without inducing substantial curing of the inner coating.

When Maillard reactants are cured they undergo chemical change. Examples of these chemical changes include, but are not limited to, (i) covalent bonding, (ii) hydrogen bonding of coating components, and chemical cross-linking of polymers and/or oligomers in the coating. These changes may increase the coating's durability and solvent resistance as compared to the uncured coating. Curing a coating may result in the formation of a thermoset material. Furthermore, curing may include the generation of melanoidins. Curing can be initiated by, for example, heat, electromagnetic radiation, or electron beams.

As used herein, the term "alkaline" indicates a solution having a pH that is greater than or equal to about 7. For example, the pH of the solution can be less than or equal to about 10. In addition, the solution may have a pH from about 7 to about 10, or from about 8 to about 10, or from about 9 to about 10.

As used herein, the term "ammonium" includes, but is not limited to, $^+NH_4$, $^+NH_3R^1$ and $^+NH_2R^1R^2$, where $R^1$ and $R^2$ are each independently selected in $^+NH_2R^1R^2$, and where $R^1$ and $R^2$ are selected from alkyl, cycloalkyl, alkenyl, cycloalkenyl, heterocyclyl, aryl, and heteroaryl.

The term "alkyl" refers to a saturated monovalent chain of carbon atoms, which may be optionally branched; the term "cycloalkyl" refers to a monovalent chain of carbon atoms, a portion of which forms a ring; the term "alkenyl" refers to an unsaturated monovalent chain of carbon atoms including at least one double bond, which may be optionally branched; the term "cycloalkenyl" refers to an unsaturated monovalent chain of carbon atoms, a portion of which forms a ring; the term "heterocyclyl" refers to a monovalent chain of carbon and heteroatoms, wherein the heteroatoms are selected from nitrogen, oxygen, and sulfur, a portion of which, including at least one heteroatom, form a ring; the term "aryl" refers to an aromatic mono or polycyclic ring of carbon atoms, such as phenyl, naphthyl, and the like; and the term "heteroaryl" refers to an aromatic mono or polycyclic ring of carbon atoms and at least one heteroatom selected from nitrogen, oxygen, and sulfur, such as pyridinyl, pyrimidinyl, indolyl, benzoxazolyl, and the like. It is to be understood that each of alkyl, cycloalkyl, alkenyl, cycloalkenyl, and heterocyclyl may be optionally substituted with independently selected groups such as alkyl, haloalkyl, hydroxyalkyl, aminoalkyl, carboxylic acid and derivatives thereof, including esters, amides, and nitriles, hydroxy, alkoxy, acyloxy, amino, alkyl and dialkylamino, acylamino, thio, and the like, and combinations thereof. It is further to be understood that each of aryl and heteroaryl may be optionally substituted with one or more independently selected substituents, such as halo, hydroxy, amino, alkyl or dialkylamino, alkoxy, alkylsulfonyl, cyano, nitro, and the like.

As used herein, the term "carboxylic acid" indicates an organic acid with one or more carboxyl groups (—COOH). Carboxyl groups (—COOH) are also referred to herein as carboxylic acid groups (—COOH). A carboxylic acid may be one or more of a monomeric monocarboxylic acid, a monomeric polycarboxylic acid, a polymeric polycarboxylic acid, an anhydride thereof, or a combination thereof. In one aspect, the carboxylic acid ammonium salt reactant is sufficiently non-volatile to maximize its ability to remain available for reaction with the carbohydrate reactant of a Maillard reaction. In another aspect, the carboxylic acid ammonium salt reactant may be substituted with other chemical functional groups. These functional groups may promote, for example, one or more of the following properties: (1) bonding with substrate particles; (2) compatibility with inner or outer coatings; (3) miscibility with the liquid phase of a fracturing fluid; (4) crosslinking with a suitable crosslinking agent; and (5) bonding with fractured walls of a fractured formation to which proppant particles have been introduced.

As used herein, the term "polycarboxylic acid" indicates a dicarboxylic, tricarboxylic, tetracarboxylic, pentacarboxylic, and like monomeric polycarboxylic acids, and anhydrides, and combinations thereof, as well as polymeric polycarboxylic acids, anhydrides, copolymers, and combinations thereof.

Illustratively, a monomeric polycarboxylic acid may be a dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Or, illustratively, the polycarboxylic acid(s) itself may be a tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids may be optionally substituted, such as with hydroxy, halo, alkyl, alkoxy, and the like. In one variation, the polycarboxylic acid is the saturated aliphatic tricarboxylic acid, citric acid. Other suitable polycarboxylic acids are contemplated to include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and combinations thereof.

Illustratively, a polymeric polycarboxylic acid may be an acid, for example, polyacrylic acid, polymethacrylic acid, polymaleic acid, and like polymeric polycarboxylic acids, copolymers thereof, anhydrides thereof, and mixtures thereof. Examples of commercially available polyacrylic acids include AQUASET-529 (Rohm & Haas, Philadelphia, Pa., USA), CRITERION 2000 (Kemira, Helsinki, Finland, Europe), and SOKALAN (BASF, Ludwigshafen, Germany, Europe). With respect to SOKALAN, this is a water-soluble polyacrylic copolymer of acrylic acid and maleic acid, having a molecular weight of approximately 4000. AQUASET-529 is a composition containing polyacrylic acid crosslinked with glycerol, also containing sodium hypophosphite as a catalyst. CRITERION 2000 is an acidic solution of a partial salt of polyacrylic acid, having a molecular weight of approximately 2000.

Further, compositions including polymeric polycarboxylic acids are also contemplated to be useful in preparing the coatings described herein, such as those compositions described in U.S. Pat. Nos. 5,318,990, 5,661,213, 6,136,916, and 6,331,350. In particular, in U.S. Pat. Nos. 5,318,990 and 6,331,350 an aqueous solution of a polymeric polycarboxylic acid, a polyol, and a catalyst is described. A Maillard reaction to form a coating may take place simultaneously with a reaction to form a polymeric ester from a polycarboxylic acid and a polyol, as described in U.S. Pat. Nos. 5,318,990 and 6,331,350. In such a simultaneous reaction, a blend of Maillard reaction products with polymeric esters may form, in situ, during the formation of the coating.

As described in U.S. Pat. Nos. 5,318,990 and 6,331,350, the polymeric polycarboxylic acid comprises an organic polymer or oligomer containing more than one pendant carboxyl group. The polymeric polycarboxylic acid may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polymeric polycarboxylic acid may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art. The polymeric polycarboxylic acid may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art. The polymeric polycarboxylic acids may comprise homopolymers and copolymers of polyacrylic acid. The molecular weight of the polymeric polycarboxylic acid, and in particular polyacrylic acid polymer, may be is less than 10000, less than 5000, or about 3000 or less. For example, the molecular weight may be 2000.

Compositions including polymeric polycarboxylic acids described in U.S. Pat. Nos. 5,661,213 and 6,136,916 that are contemplated to be useful in preparing the coatings described herein comprise an aqueous solution of a polymeric polycarboxylic acid, a polyol containing at least two hydroxyl groups, and a phosphorous-containing accelerator, wherein the ratio of the number of equivalents of carboxylic acid groups, to the number of equivalents of hydroxyl groups is from about 1:0.01 to about 1:3.

As disclosed in U.S. Pat. Nos. 5,661,213 and 6,136,916, the polymeric polycarboxylic acid may be, a polyester containing at least two carboxylic acid groups or an addition polymer or oligomer containing at least two copolymerized carboxylic acid-functional monomers. The polymeric polycarboxylic acid may be an addition polymer formed from at least one ethylenically unsaturated monomer. The addition polymer may be in the form of a solution of the addition polymer in an aqueous medium such as, an alkali-soluble resin which has been solubilized in a basic medium; in the form of an aqueous dispersion, for example, an emulsion-polymerized dispersion; or in the form of an aqueous suspension. The addition polymer must contain at least two carboxylic acid groups, anhydride groups, or salts thereof. Ethylenically unsaturated carboxylic acids such as, methacrylic acid, acrylic acid, crotonic acid, fumaric acid, maleic acid, 2-methyl maleic acid, itaconic acid, 2-methyl itaconic acid, α,β-methylene glutaric acid, monoalkyl maleates, and monoalkyl fumarates; ethylenically unsaturated anhydrides, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomer may include acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; acrylonitrile or methacrylonitrile; and the like. The addition polymer containing at least two carboxylic acid groups, anhydride groups, or salts thereof may have a molecular weight from about 300 to about 10,000,000. A molecular weight from about 1000 to about 250,000 may be used. When the addition polymer is an alkali-soluble resin having a carboxylic acid, anhydride, or salt thereof, content of from about 5% to about 30%, by weight based on the total weight of the addition polymer, a molecular weight from about 10,000 to about 100,000 may be utilized. Methods for preparing these additional polymers are well-known in the art.

As described in U.S. Pat. Nos. 5,661,213 and 6,136,916, the polyol (in a composition including a polymeric polycarboxylic acid) contains at least two hydroxyl groups and should be sufficiently nonvolatile that it remains substantially available for reaction with the polymeric polycarboxylic acid in the composition during heating and curing operations. The polyol may be a compound with a molecular weight less than about 1000 bearing at least two hydroxyl groups, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols, for example, β-hydroxyalkylamides, for example, bis-[N,N-di(β-hydroxyethyl)]adipamide, bis[N,N-di(β-hydroxypropyl)]azelamide, bis[N—N-di(β-hydroxypropyl)]adipamide, bis[N—N-di(β-hydroxypropyl)]glutaramide, bis[N—N-di(β-hydroxypropyl)]succinamide, and bis[N-methyl-N-(β-hydroxyethyl)]oxamide, or it may be an addition polymer containing at least two hydroxyl groups such as, polyvinyl alcohol, partially hydrolyzed polyvinyl acetate, and homopolymers or copolymers of hydroxyethyl (meth)acrylate, hydroxypropyl (meth)acrylate, and the like.

Phosphorous-containing accelerators are described, for example in U.S. Pat. Nos. 5,661,213 and 6,136,916. The phosphorous-containing accelerator (in a reaction mixture including a polymeric polycarboxylic acid and a polyol) may be a compound with a molecular weight less than about 1000 such as, an alkali metal hypophosphite salt, an alkali metal phosphite, an alkali metal polyphosphate, an alkali metal dihydrogen phosphate, a polyphosphoric acid, and an alkyl phosphinic acid or it may be an oligomer or polymer bearing phosphorous-containing groups such as, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the carboxyoic acid and the polyol. A level of phosphorous-containing accelerator of from about 2.5% to about 10%, by weight based on the combined weight of the carboxylic acid and the polyol, may be utilized.

As used herein, the term "amine base" includes, but is not limited to, ammonia, a primary amine, i.e., $NH_2R^1$, and a secondary amine, i.e., $NHR^1R^2$, where $R^1$ and $R^2$ are each independently selected in $NHR^1R^2$, and where $R^1$ and $R^2$ are selected from alkyl, cycloalkyl, alkenyl, cycloalkenyl, heterocyclyl, aryl, and heteroaryl, as defined herein. Illustratively, the amine base may be substantially volatile or substantially non-volatile under conditions sufficient to promote formation of the thermoset coating during thermal curing. Illustratively, the amine base may be a substantially volatile base, such as, ammonia, ethylamine, diethylamine, dimethylamine, and ethylpropylamine. Alternatively, the amine base may be a substantially non-volatile base, for example, aniline, 1-naphthylamine, 2-naphthylamine, and para-aminophenol.

As used herein, "reducing sugar" indicates one or more sugars that contain aldehyde groups, or that can tautomerize, to contain aldehyde groups, which groups are reactive with an amino group under Maillard reaction conditions and which groups may be oxidized with, for example, $Cu^{+2}$ to afford carboxylic acids. It is also appreciated that any such carbohydrate reactant may be optionally substituted, such as with hydroxy, halo, alkyl, alkoxy, and the like. It is further appreciated that in any such carbohydrate reactant, one or more chiral centers are present, and that both possible optical isomers at each chiral center are contemplated to be included in the invention described herein. Further, it is also to be understood that various mixtures, including racemic mixtures, or other diastereomeric mixtures of the various optical isomers of any such carbohydrate reactant, as well as various geometric isomers thereof, may be used in one or more embodiments described herein.

Examples of amine reactants for a Maillard reaction include proteins, peptides, amino acids, ammonium salts of carboxylic acids, ammonium salts of polymeric polycarboxylic acids, and ammonium salts of monomeric polycarboxylic acids. In this context, "ammonium" can be $[^+NH_4]_x$, $[^{3o}NH_3R^1]_x$, and $[^{3o}NH_3R^1R^2]_x$, where x is at least about 1. With respect to $^+NH_2R^1R^2$, $R^1$ and $R^2$ are each independently selected. Moreover, $R^1$ and $R^2$ are selected from alkyl, cycloalkyl, alkenyl, cycloalkenyl, heterocyclyl, aryl, and heteroaryl, as described above. Examples of reducing-sugar reactants for producing melanoidins, including monosaccharides, in their aldose or ketose form, polysaccharides, or combinations thereof. Illustrative non-carbohydrate carbonyl reactants for producing melanoidins include various aldehydes, e.g., pyruvaldehyde and furfural, as well as compounds such as ascorbic acid and quinone.

A Maillard reaction culminates in the production of melanoidins. In its initial phase, a Maillard reaction involves a carbohydrate reactant, for example, a reducing sugar (note that the carbohydrate reactant may come from a substance capable of producing a reducing sugar under Maillard reaction conditions). The reaction also involves condensing the carbohydrate reactant (e.g., reducing sugar) with an amine reactant, i.e., a compound possessing an amino group. In other words, the carbohydrate reactant and the amine reactant are the melanoidin reactants for a Maillard reaction. The condensation of these two constituents produces an N-substituted glycosylamine. The compound possessing a free amino group in a Maillard reaction may be present in the form of an amino acid. The free amino group can also come from a protein or a peptide where the free amino groups are available in the form of, for example, the ε-amino group of lysine residues, and/or the α-amino group of the terminal amino acid.

Another aspect of conducting a Maillard reaction as described herein is that, initially, the aqueous Maillard reactant solution (which also is a coating), as described above, may have an alkaline pH. However, once curing is initiated, the pH decreases (e.g., the coating may become slightly acidic).

The following discussion is directed to (i) examples of carbohydrate and amine reactants, which can be used in a Maillard reaction and (ii) how these reactants can be combined. First, it should be understood that any carbohydrate and/or compound possessing a primary or secondary amino group, which will act as a reactant in a Maillard reaction, can be utilized in the coatings of the present invention. Such compounds can be identified and utilized by one of ordinary skill in the art with the guidelines disclosed herein.

With respect to exemplary reactants, it should also be appreciated that using an ammonium salt of a carboxylic acid as an amine reactant is an effective reactant in a Maillard reaction. Ammonium salts of carboxylic acids can be generated by neutralizing the acid groups with an amine base, thereby producing carboxylic acid ammonium salt groups. Complete neutralization, i.e., about 100% calculated on an equivalents basis, may eliminate any need to titrate or partially neutralize acid groups in the carboxylic acid(s) prior to coating formation. However, it is expected that less-than-complete neutralization would not inhibit formation of the coating. Note that neutralization of the acid groups of the carboxylic acid(s) may be carried out either before or after the polycarboxylic acid(s) is mixed with the carbohydrate(s).

With respect to the carbohydrate reactant, it may include one or more reactants having one or more reducing sugars. In one aspect, any carbohydrate reactant should be sufficiently nonvolatile to maximize its ability to remain available for reaction with the carboxylic acid ammonium salt reactant. The carbohydrate reactant may be a monosaccharide in its aldose or ketose form, including a triose, a tetrose, a pentose, a hexose, or a heptose; or a polysaccharide; or combinations thereof. A carbohydrate reactant may be a reducing sugar, or one that yields one or more reducing sugars in situ under thermal curing conditions. For example, when a triose serves as the carbohydrate reactant, or is used in combination with other reducing sugars and/or a polysaccharide, an aldotriose sugar or a ketotriose sugar may be utilized, such as glyceraldehyde and dihydroxyacetone, respectively. When a tetrose serves as the carbohydrate reactant, or is used in combination with other reducing sugars and/or a polysaccharide, aldotetrose sugars, such as erythrose and threose; and ketotetrose sugars, such as erythrulose, may be utilized. When a pentose serves as the carbohydrate reactant, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, may be utilized. When a hexose serves as the carbohydrate reactant, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, may be utilized. When a heptose serves as the carbohydrate reactant, or is used in combination with other reducing sugars and/or a polysaccharide, a ketoheptose sugar such as sedoheptulose may be utilized. Other stereoisomers of such carbohydrate reactants not known to occur naturally are also contemplated to be useful in preparing the coating compositions as described herein. When a polysaccharide serves as the carbohydrate, or is used in combination with monosaccharides, sucrose, lactose, maltose, starch, and cellulose may be utilized.

Furthermore, the carbohydrate reactant in the Maillard reaction may be used in combination with a non-carbohydrate polyhydroxy reactant. Examples of non-carbohydrate polyhydroxy reactants which can be used in combination with the carbohydrate reactant include, but are not limited to, trimethylolpropane, glycerol, pentaerythritol, polyvinyl alcohol, partially hydrolyzed polyvinyl acetate, fully hydrolyzed polyvinyl acetate, and mixtures thereof. In one aspect, the non-carbohydrate polyhydroxy reactant is sufficiently nonvolatile to maximize its ability to remain available for reaction with a monomeric or polymeric carboxylic acid reactant. It is appreciated that the hydrophobicity of the non-carbohydrate polyhydroxy reactant may be a factor in determining the physical properties of a coating prepared as described herein.

When a partially hydrolyzed polyvinyl acetate serves as a non-carbohydrate polyhydroxy reactant, a commercially available compound such as an 87-89% hydrolyzed polyvinyl acetate may be utilized, such as, DuPont ELVANOL 51-05. DuPont ELVANOL 51-05 has a molecular weight of about 22,000-26,000 Da and a viscosity of about 5.0-6.0 centipoises. Other partially hydrolyzed polyvinyl acetates contemplated to be useful in preparing coating compositions as described herein include, but are not limited to, 87-89% hydrolyzed polyvinyl acetates differing in molecular weight and viscosity from ELVANOL 51-05, such as, for example, DuPont ELVANOL 51-04, ELVANOL 51-08, ELVANOL 50-14, ELVANOL 52-22, ELVANOL 50-26, ELVANOL 50-42; and partially hydrolyzed polyvinyl acetates differing in molecular weight, viscosity, and/or degree of hydrolysis from ELVANOL 51-05, such as, DuPont ELVANOL 51-03 (86-89% hydrolyzed), ELVANOL 70-14 (95.0-97.0% hydrolyzed), ELVANOL 70-27 (95.5-96.5% hydrolyzed), ELVANOL 60-30 (90-93% hydrolyzed). Other partially hydrolyzed polyvinyl acetates contemplated to be useful in preparing coating compositions as described herein include, but are not limited to, Clariant MOWIOL 15-79, MOWIOL 3-83, MOWIOL 4-88, MOWIOL 5-88, MOWIOL 8-88, MOWIOL 18-88, MOWIOL 23-88, MOWIOL 26-88, MOWIOL 40-88, MOWIOL 47-88, and MOWIOL 30-92, as well as Celanese CELVOL 203, CELVOL 205, CELVOL 502, CELVOL 504, CELVOL 513, CELVOL 523, CELVOL 523TV, CELVOL 530, CELVOL 540, CELVOL 540TV, CELVOL 418, CELVOL 425, and CELVOL 443. Also contemplated to be useful are similar or analogous partially hydrolyzed polyvinyl acetates available from other commercial suppliers.

When a fully hydrolyzed polyvinyl acetate serves as a non-carbohydrate polyhydroxy reactant, Clariant MOWIOL 4-98, having a molecular weight of about 27,000 Da, may be utilized. Other fully hydrolyzed polyvinyl acetates contemplated to be useful include, but are not limited to, DuPont ELVANOL 70-03 (98.0-98.8% hydrolyzed), ELVANOL 70-04 (98.0-98.8% hydrolyzed), ELVANOL 70-06 (98.5-99.2% hydrolyzed), ELVANOL 90-50 (99.0-99.8% hydrolyzed), ELVANOL 70-20 (98.5-99.2% hydrolyzed), ELVANOL 70-30 (98.5-99.2% hydrolyzed), ELVANOL 71-30 (99.0-99.8% hydrolyzed), ELVANOL 70-62 (98.4-99.8% hydrolyzed), ELVANOL 70-63 (98.5-99.2% hydrolyzed), ELVANOL 70-75 (98.5-99.2% hydrolyzed), Clariant MOWIOL 3-98, MOWIOL 6-98, MOWIOL 10-98, MOWIOL 20-98, MOWIOL 56-98, MOWIOL 28-99, and Celanese CELVOL 103, CELVOL 107, CELVOL 305, CELVOL 310, CELVOL 325, CELVOL 325LA, and CELVOL 350, as well as similar or analogous fully hydrolyzed polyvinyl acetates from other commercial suppliers.

The aforementioned Maillard reactants may be combined to make an aqueous composition that includes a carbohydrate reactant and an amine reactant. These aqueous compositions represent examples of uncured coatings. As discussed below, these aqueous compositions can be used to form outer coatings on a proppant. These coatings are formaldehyde-free, curable, alkaline, aqueous coating compositions. Furthermore, as indicated above, the carbohydrate reactant of the Maillard reactants may be used in combination with a non-carbohydrate polyhydroxy reactant. Accordingly, any time the carbohydrate reactant is mentioned it should be understood that it can be used in combination with a non-carbohydrate polyhydroxy reactant.

In one illustrative embodiment, the aqueous solution of Maillard reactants may include (i) an ammonium salt of one or more carboxylic acid reactants and (ii) one or more carbohydrate reactants having a reducing sugar. The pH of this solution prior to placing it in contact with the material to be bound may be greater than or equal to about 7. In addition, this solution may have a pH of less than or equal to about 10. The ratio of the number of moles of the carboxylic acid reactant(s) to the number of moles of the carbohydrate reactant(s) may be in the range from about 1:4 to about 1:15. In one example, the ratio of the number of moles of the carboxylic acid reactant(s) to the number of moles of the carbohydrate reactant(s) in the coating composition may be about 1:5. In another example, the ratio of the number of moles of the carboxylic acid reactant(s) to the number of moles of the carbohydrate reactant(s) may be about 1:6. In yet another example, the ratio of the number of moles of the carboxylic acid reactant(s) to the number of moles of the carbohydrate reactant(s) may be about 1:7.

As described above, the aqueous coating composition may include (i) an ammonium salt of one or more carboxylic acid reactants and (ii) one or more carbohydrate reactants having a reducing sugar. It should be appreciated that when an ammonium salt of a monomeric or a polymeric carboxylic acid is used as an amine reactant, the molar equivalents of ammonium ion may or may not be equal to the molar equivalents of acid salt groups present on the carboxylic acid. In one illustrative example, an ammonium salt may be monobasic, dibasic, or tribasic when a tricarboxylic acid is used as a polycarboxylic acid reactant. Thus, the molar equivalents of the ammonium ion may be present in an amount less than or about equal to the molar equivalents of acid salt groups present in a carboxylic acid. Accordingly, the salt can be monobasic or dibasic when the polycarboxylic acid reactant is a dicarboxylic acid. Further, the molar equivalents of ammonium ion may be present in an amount less than, or about equal to, the molar equivalents of acid salt groups present in a polymeric polycarboxylic acid, and so on and so forth. When a monobasic salt of a dicarboxylic acid is used, or when a dibasic salt of a tricarboxylic acid is used, or when the molar equivalents of ammonium ions are present in an amount less than the molar equivalents of acid salt groups present in a polymeric polycarboxylic acid, the pH of the coating composition may require adjustment to achieve alkalinity.

Curing of the outer coating may take place by heating the coated substrate to a sufficient curing temperature for a time sufficient to achieve substantial curing of the coating. The curing temperature may be, for example, from about 300° F. (149° C.) to about 600° F. (316° C.).

With respect to making coatings that are water-insoluble when cured, it should be appreciated that the ratio of the number of molar equivalents of acid salt groups present on the carboxylic acid reactant(s) to the number of molar equivalents of hydroxyl groups present on the carbohydrate reactant(s) may be in the range from about 0.04:1 to about 0.15:1. After curing, these formulations result in a water-resistant thermoset coating. In one variation, the number of molar equivalents of hydroxyl groups present on the carbohydrate reactant(s) is about twenty five-fold greater than the number of molar equivalents of acid salt groups present on the carboxylic acid reactant(s). In another variation, the number of molar equivalents of hydroxyl groups present on the carbohydrate reactant(s) is about ten-fold greater than the number of molar equivalents of acid salt groups present on the carboxylic acid reactant(s). In yet another variation, the number of molar equivalents of hydroxyl groups present on the carbohydrate reactant(s) is about six-fold greater than the number of molar equivalents of acid salt groups present on the carboxylic acid reactant(s).

Various additives can be incorporated into the coating compositions. These additives give the coatings of the present invention additional desirable characteristics. For example, the coating may include a silicon-containing coupling agent, especially when the coating is used as an innermost of a substrate including a silica containing material, such as sand. Many silicon-containing coupling agents are commercially available from the Dow-Corning Corporation, Petrach Systems, and by the General Electric Company. Illustratively, the silicon-containing coupling agent includes compounds such as silylethers and alkylsilyl ethers, each of which may be optionally substituted, such as with halogen, alkoxy, amino, and the like. In one variation, the silicon-containing compound is an amino-substituted silane, such as, gamma-aminopropyltriethoxy silane (General Electric Silicones, SILQUEST A-1101; Wilton, Conn.; USA). In another variation, the silicon-containing compound is an amino-substituted silane, for example, aminoethylaminopropyltrimethoxy silane (Dow Z-6020; Dow Chemical, Midland, Mich.; USA). In another variation, the silicon-containing compound is gamma-glycidoxypropyltrimethoxysilane (General Electric Silicones, SILQUEST A-187). In yet another variation, the silicon-containing compound is an n-propylamine silane (Creanova (formerly Huls America) HYDROSIL 2627; Creanova; Somerset, N.J.; U.S.A.).

The silicon-containing coupling agents may be present in the coating in the range from about 0.1 percent to about 1 percent by weight based upon the dissolved coating solids (i.e., about 0.1 percent to about 1 percent based upon the weight of the solids added to the aqueous solution). In one application, one or more of these silicon-containing compounds can be added to the aqueous uncured coating. The coating is then applied to the material to be coated. Thereafter, the coating may be cured or partially cured.

A coating that includes a silicone containing coupling agent can be prepared by admixing about 10 to about 50 weight percent aqueous solution of one or more carboxylic acid reactants, already neutralized with an amine base or neutralized in situ, with about 10-50 weight percent aqueous solution of one or more carbohydrate reactants having reducing sugar, and an effective amount of a silicon-containing coupling agent. In one variation, one or more carboxylic acid reactants and one or more carbohydrate reactants, the latter having reducing sugar, may be combined as solids, mixed with water, and the mixture then treated with aqueous amine base (to neutralize the one or more carboxylic acid reactants) and a silicon-containing coupling agent to generate an aqueous solution 10-50 weight percent in each carboxylic acid reactant and each carbohydrate reactant.

By following guidelines disclosed herein, one of ordinary skill in the art will be able to vary the concentrations of the reactants of the aqueous coating to produce a wide range of coating compositions. In particular, aqueous coating compositions can be formulated to have an alkaline pH. For example, a pH in the range from greater than or equal to about 7 to less than or equal to about 10. Examples of the coating reactants that can be manipulated include (i) the carboxylic acid reactant(s), (ii) the amine base, (iii) the carbohydrate reactant(s), and (iv) the silicon-containing coupling agent. Having the pH of the aqueous coatings (e.g., uncured coatings) in the alkaline range inhibits the corrosion of materials the coating comes in contact with.

Example 1

Preparation of Outer Coating Resin

Citric acid, dextrose and ammonium hydroxide were used to form a coating resin. 23.9 grams of anhydrous citric acid and 143.2 grams of dextrose were added to 200 grams of deionized water which was at room temperature, 22° C. The solution was mixed for ten minutes and then 32.2 grams of 19% ammonium hydroxide solution was added. Mixing continued for 25 minutes and then 1.2 grams of SILQUEST A1100 silane was added. Mixing was continued for another 10 minutes, and the liquid resin was then bottled. The liquid resin had approximately 41.7% solids (based on weight of dry adds), a pH of 6.10 and a cure at 150° C. on a hot plate for four minutes and 30 seconds.

Example 2

Coating of a Cured Proppant

The liquid resin from Example 1 was used to produce a cured single layer coated proppant. 3,000 grams of 20/40 grade frac sand from US Silica was preheated in a 500° F. (260° C.) forced air oven. The heated sand was placed in a laboratory scale pug mill. After ten seconds of mixing the temperature of the frac sand was 472° F. (244° C.) as measured with an infrared temperature gun. 120 grams of the polymer from Example 1 was added. Mixing continued for one minute and fifty seconds. The coated frac sand was discharged from the pug mill, screened to remove any agglomerations and air cooled by pouring from pan to pan several times. The coated frac sand was a dark brown in color and was free flowing.

The coated sand of Example 2 was tested for curability as measured a Dieter 365A Hot Shell Tensile Tester. Curing the coated sand for three minutes at 450° F. (232° C.) and then pulling the dog bone gave a strength of 0 psi. Another sample of the coated sand from Example 2 was placed in a three cavity dog bone maker. The coated frac sand was overfilled and leveled to give approximately a quarter of an inch excess above the surface of the dog bone form. The dog bone form was sandwiched between metal plates and the entire assembly was placed into a heated press. The platens of the press were at 450° F. (232° C.) and pressure was applied to give an effective 2,000 psi (13,800 kPa) on the dog bone maker, and heat and pressure was applied for ten minutes. Following that the assembly was removed from the press and allowed to cool to room temperature. On removal of the metal plates the coated frac sand was free flowing indicating no bonding under heat and pressure.

Example 3

Preparation of a Multi Coated Curable Proppant 3,000 grams of 20/40 grade frac sand from US Silica was preheated in a 500° F. (260° C.) forced air oven. The heated sand was placed in a laboratory scale pug mill. After fifteen seconds of mixing the temperature of the frac sand was 420° F. (216° C.) as measured with an infrared temperature gun. 60 grams of GP-2202, a commercially available resin from Georgia-Pacific Chemicals LLC, was added. Mixing was continued for fortyfive seconds. A solution of 6.6 grams of hexamethylenetetramine in 30 mls of water was added. Mixing continued for another twenty seconds. At this point 84 grams of the polymer made in Example 1 was added. Mixing continued for another minute and forty seconds. At this point the coated frac sand was discharged from the pug mill. The coated frac sand was a brownish golden yellow color. As discharged at 214° F. (101° C.) the mixture exhibited a tendency to block, that is stick together, but on further cooling below 135° F. (57° C.), the coated sand remained free flowing.

The coated sand made in Example 3 was tested for hot tensile strength as described in Example 2. After three minutes curing at 450° F. (232° C.), a bond strength of 40 psi (276 kPa) resulted.

Again another sample of the coated sand from Example 3 was overfilled into a three position dog bone maker, leveled off and sandwiched between two metal plates. The assembly was put into a heated press and allowed to cure under 2,000 psi (13,800 kPa) effective pressure and 450° F. (232° C.) for ten minutes. The assembly was removed and allowed to cool to room temperature. The formed dog bones were removed from the form and the bond strengths determined by a Dieter 400A Universal Sand Strength Machine. The average for the test was 340 psi (2,340 kPa).

The 40 psi (276 kPa) hot tensile test shows that the top layer of sugar resin is shielding the underlying novolac hexamethylenetetramine curable layer. Thus, low bond strength under no pressure was obtained. The dog bones cured under heat and pressure show that the inner layer is still curable and the pressure allows this inner layer to ooze out, flow and to bond. This is shown by the high strength of 340 psi (2,340 kPa).

Example 4

Preparation of Outer Coating Resin

A resin was prepared substantially as in Example 1, except that a higher solids content was obtained. To 58 grams of deionized water at room temperature, 12.3 grams of citric acid and 73.6 grams of dextrose were added and mixed for 15 minutes. 16.6 grams of 19% ammonium hydroxide was added and mixed for 10 minutes. 0.62 Grams of SILQUEST A1100 silane was added and mixed for 10 more minutes and then the resin solution was bottled. This resin solution had a pH of 5.95, and a RI of 1.4362. 28% ammonium hydroxide was added drop wise (0.67 grams of ammonia added) to this solution while stirring to give a final solution of pH 7.85 and a 150° C. Hot Plate Cure for four minutes and 10 seconds. The calculated solids content based on the weight of the dry adds was 53%.

Example 5

Coating of a Curable Proppant

The liquid resin solution from Example 4 was used to coat a proppant. 3,000 grams of 20/40 frac sand, from US Silica, was preheated in a 500° F. (260° C.) electric oven.

The heated frac sand was put into a laboratory sized pug mill. After mixing five seconds, 60 grams of GP-2202, a commercially avaity frac sand novoalc available from Georgia Pacific Chemicals LLC, was added to the hot sand at a temperature of 480° F. (249° C.) as measured by an infrared temperature gun. Mixing was carried out for forty five seconds, at which time 6.6 grams of hexamethylenetet-raime dissolved in 21 grams of water was added. Mixing was continued for another ten seconds. At this time 85 grams of the polymer made in Example 4 was added. The temperature at the time of the polymer addition was 326° F. (163° C.). Mixing was continued for one minute and fifty five seconds. The temperature of the coated sand was 249° F. (121° C.). 67 grams of water was added to the coated sand and mixing continued for another minute and thirty seconds. At this time the coated sand was discharged from the pug mill at a temperature of 150° F. (66° C.). The coated sand exhibited some blockage and stick together, but as the mass cooled to 110° F. (43° C.), it then remained free flowing. The coated sand was brown in color.

The coated sand made in Example 5 was tested for bonding strengths. The three minute hot tensile test as measured by a Dieter 365A Hot Shell Tensile Tester gave a strength of 0 psi (0 kPa). Another sample of this coated sand was put into a three position dog bone maker and put in a heated press for ten minutes. The temperature of the heated platens was set at 450° F. (232° C.), and an effective overall pressure on the dog bone maker was 2,000 psi (13,800 kPa). At the end of the 10 minutes the dog bone maker was taken out of the press. The dog bones were separated from the form and allowed to cool to room temperature. Their strength was measured on a Dieter 400-A Universal Sand Strength Machine. This gave an average strength of 150 psi (1,030 kPa).

The 0 psi (0 kPa) hot tensile shows that the top layer of sugar resin was cured and shields the underlying novolac hexamethylenetetramine curable layer. Thus, no bond strength was obtained while curing under no pressure. The dog bones cured under heat and pressure show that the inner layer is still curable and the pressure allows this inner layer to ooze out, flow and to bond. This is shown by the high strength of 150 psi (1,030 kPa). This run's strength is lower because the higher temperatures that the coating process was held at resulted in partial curing of the underlying novolac hexamethylenetetramine layer. However, the main point demonstrated is that the partially cured inner layer is still capable of further curing and, when fully cured, resulted in high bond strength.

Comparative Example

Coating with Sugar

In this example dextrose was used as the outer curable coating. The coated proppant upon coating was gummy and remained gummy after cooling to room temperature and would not be suitable for use. This shows that sugar by itself is not effective.

Formation Treatment

The free-flowing particles as produced by the above method may be used as proppants, gravel or fluid loss agents in hydraulic fracturing, frac packing and gravel packs. In carrying out a hydraulic fracturing operating a fracture is first generated by injecting a viscous fluid into the formation at a sufficient rate and pressure to cause the formation to fail in tension. Injection of the fluid is typically continued until a fracture of the desired geometry is obtained. A carrier fluid having the proppant suspended therein is then pumped into the fracture. The carrier fluid bleeds off into the formation and deposits the propping agent in the fracture. This process is controlled by fluid loss agents which are small aggregate particles which temporarily slow the fluid loss to the formation.

After the proppant is placed, the well is shut in with pressure maintained on the formation. As the pressure within the fracture approaches the normal formation pressure, the fracture walls close in on the proppant and apply an overburden stress thereto. When the proppant includes a cured outer coating and a curable inner coating, it is believed this stress ruptures the outer coating exposing the curable inner coating. At the same time ambient formation temperature heats the inner resin coating. When the inner resin coating includes a thermosetting resin, the resin fuses and unites at contact areas between contiguous particles or with the formation walls. As the temperature increases the polymerization reaction proceeds until the resin is cured into an insoluble and infusible cross-linked state. The pendular regions between adjacent particles bond the packed particles into a permeable mass having considerable compressive strength.

A more detailed description of the standard industry practices for the use of resin coated particles in hydraulic fracturing and gravel pack completion is disclosed in U.S. Pat. No. 3,929,191. Details of such applications are well known in the art.

In another embodiment, the present invention is:

1. A proppant for a well treatment fluid, the proppant comprising discrete particles of a substrate coated with a resin comprising a product of the Maillard reaction between a carbohydrate and an amine and/or an ammonium compound.
2. The proppant of any of the preceding paragraphs, wherein the carbohydrate includes a monosaccharide.
3. The proppant of any of the preceding paragraphs, wherein the monosaccharide includes a reducing sugar.
4. The proppant of any of the preceding paragraphs, wherein the reducing sugar includes at least one of dextrose, xylose, fructose, and dihydroxyacetone.
5. The proppant of any of the preceding paragraphs, wherein said reaction is between a carbohydrate and an ammonium salt of a carboxylic acid.
6. The proppant of any of the preceding paragraphs, wherein said reaction is between a carbohydrate and an ammonium salt of a polycarboxylic acid.
7. The proppant of any of the preceding paragraphs, wherein said polycarboxylic acid comprises citric acid.
8. The proppant of any of the preceding paragraphs, wherein the reaction mixture for forming said resin comprises a polyol.
9. The proppant of any of the preceding paragraphs, wherein the reaction mixture for forming said resin comprises a phosphorous-containing accelerator.
10. The proppant of any of the preceding paragraphs, wherein the substrate is coated with a single layer of a coating comprising the Maillard reaction product.
11. The proppant of any of the preceding paragraphs, wherein the substrate is coated with two layers of coating, wherein a first, innermost layer comprises a fusible resin, and a second, outermost layer comprises said product of said Maillard reaction.
12. The proppant of any of the preceding paragraphs, wherein said fusible resin is a thermoplastic resin.
13. The proppant of any of the preceding paragraphs, wherein the thermoplastic resin is comprised of an ethylene vinyl acetate, a phenol-formaldehyde novolac resin, a pine rosin, a modified rosin, a rosin ester, a terpene resin, a coumarone-indene resin, an oligomer of $C_5$ hydrocarbons, an oligomer of $C_9$ hydrocarbons, an oligomeric reaction product of a terpene and a phenolic, and an oligomeric reaction product of a terpene and a styrenic, or any combination thereof
14. The proppant of any of the preceding paragraphs, wherein said fusible resin is a curable, thermosetting resin.
15. The proppant of any of the preceding paragraphs, wherein said curable, thermosetting resin is selected from phenol-aldehyde resins, urea-aldehyde resins, melamine-aldehyde resins, epoxy resins, furfuryl alcohol resins, and copolymers of such resins.
16. The proppant of any of the preceding paragraphs, wherein the substrate particles comprise at least one of sand, glass beads, ceramics, carbon particles, and bauxite.
17. The proppant of any of the preceding paragraphs, wherein the substrate particles comprise as least one of crushed nut hulls and other natural fibers.
18. A fracturing fluid for stimulating hydrocarbon production from a subterranean formation, the fracturing fluid comprising a suspension of a carrier liquid and a proppant comprising discrete particles of a substrate coated with a resin comprising a product of the Maillard reaction between a carbohydrate and an amine or an ammonium compound.
19. The fracturing fluid of any of the preceding paragraphs, wherein the carbohydrate includes a monosaccharide.
20. The fracturing fluid of any of the preceding paragraphs, wherein the monosaccharide includes a reducing sugar.
21. The fracturing fluid of any of the preceding paragraphs, wherein the reducing sugar includes at least one of dextrose, xylose, fructose, and dihydroxyacetone.
22. The fracturing fluid of any of the preceding paragraphs, wherein said reaction is between a carbohydrate and an ammonium salt of a carboxylic acid.
23. The fracturing fluid of any of the preceding paragraphs, wherein said reaction is between a carbohydrate and an ammonium salt of a polycarboxylic acid.
24. The fracturing fluid of any of the preceding paragraphs, wherein said polycarboxylic acid comprises citric acid.
25. The fracturing fluid of any of the preceding paragraphs, wherein the substrate is coated with two layers of coating, wherein a first, innermost layer comprises a fusible resin, and a second, outermost layer comprises said product of said Maillard reaction.
26. The fracturing fluid of any of the preceding paragraphs, wherein the layer of fusible resin is composed of a curable, thermosetting resin selected from phenol-aldehyde resins, urea-aldehyde resins, melamine-aldehyde resins, epoxy resins, furfuryl alcohol resins, and copolymers of such resins.
27. The fracturing fluid of any of the preceding paragraphs, wherein the substrate particles comprise at least one of sand, glass beads, ceramics, carbon particles, and bauxite.
28. A process for stimulating hydrocarbon production from a subterranean formation, the process comprising injecting into said formation a fracturing fluid comprising a suspension of a carrier liquid and a proppant comprising discrete particles of a substrate coated with a cured resin comprising a product of the Maillard reaction between a carbohydrate and an amine or an ammonium compound.
29. The process of any of the preceding paragraphs, wherein the carbohydrate includes a monosaccharide.
30. The process of any of the preceding paragraphs, wherein the monosaccharide includes a reducing sugar.

31. The process of any of the preceding paragraphs, wherein the reducing sugar includes at least one of dextrose, xylose, fructose, and dihydroxyacetone.

32. The process of any of the preceding paragraphs, wherein said reaction is between a carbohydrate and an ammonium salt of a carboxylic acid.

33. The process of any of the preceding paragraphs, wherein said reaction is between a carbohydrate and an ammonium salt of a polycarboxylic acid.

34. The process of any of the preceding paragraphs, wherein said polycarboxylic acid comprises citric acid.

35. The process of any of the preceding paragraphs, wherein the substrate is coated with two layers of coating, wherein a first, innermost layer comprises a fusible resin, and a second, outermost layer comprises said product of said Maillard reaction.

36. The process of any of the preceding paragraphs, wherein said fusible resin is selected from phenol-aldehyde resins, urea-aldehyde resins, melamine-aldehyde resins, epoxy resins, furfuryl alcohol resins, and copolymers of such resins.

37. The process of any of the preceding paragraphs, wherein the substrate particles comprise at least one of sand, glass beads, ceramics, carbon particles and bauxite.

Further modifications and alternate embodiments of the invention will be apparent to those skilled in the art in view of this description. Accordingly, this description is to be considered as illustrative only and for the purpose of teaching those skilled in the art the manner of carrying out the invention. Various modifications may be made in the method. Applicants intend that all such modifications, alterations and variations which fall within the spirit and scope of the appended claims be embraced thereby.

What is claimed is:

1. A method for making a proppant for a well treatment fluid, comprising:
   coating a plurality of particles with a mixture of Maillard reactants selected from the group consisting of: (1) a carbohydrate and an amine, (2) a carbohydrate and an ammonium compound, and (3) a carbohydrate, an amine, and an ammonium compound, wherein the plurality of particles has a mesh size of about 6 to about 100 based on the U.S. Standard Sieve Series; and
   heating the plurality of particles coated with the mixture of Maillard reactants to a temperature of about 149° C. to about 316° C. to produce the proppant comprising the plurality of particles coated with a Maillard reaction product, wherein the plurality of particles coated with the Maillard reaction product do not stick together prior to being placed downhole.

2. The method of claim 1, wherein the plurality of particles comprises sand, glass, ceramic, carbon, or bauxite.

3. The method of claim 1, wherein the plurality of particles comprises sand.

4. The method of claim 1, wherein the Maillard reaction product forms a water-insoluble coating on the plurality of particles.

5. The method of claim 1, wherein the mixture of Maillard reactants comprises the carbohydrate and the ammonium compound, and wherein the ammonium compound comprises an ammonium salt of a carboxylic acid.

6. The method of claim 1, wherein the mixture of Maillard reactants comprises the carbohydrate and the ammonium compound, and wherein the ammonium compound comprises an ammonium salt of a polycarboxylic acid.

7. The method of claim 1, wherein:
   the carbohydrate comprises a monosaccharide,
   heating the plurality of particles coated with the mixture of Maillard reactants forms the Maillard reaction product, and
   each of the plurality of particles is coated with a single layer of a coating comprising the Maillard reaction product.

8. The method of claim 1, wherein the carbohydrate comprises dextrose, xylose, fructose, dihydroxyacetone, or any mixture thereof.

9. The method of claim 1, wherein:
   each of the plurality of particles is coated with an inner layer and an outer layer,
   the inner layer comprises a curable thermosetting resin, and
   the outer layer comprises the Maillard reaction product.

10. The method of claim 1, wherein the mixture of Maillard reactants further comprises an additive, and wherein the additive comprises a silicone containing coupling agent.

11. The method of claim 1, wherein the mixture of Maillard reactants further comprises a silane coupling agent, and wherein the silane coupling agent comprises a gamma-aminopropyltriethoxysilane, an aminoethyl aminopropyltrimethoxysilane, a gamma-glycidoxypropyltrimethoxysilane, or an n-propylamine silane.

12. The method of claim 1, wherein:
   the plurality of particles comprises sand or ceramic,
   the mixture of Maillard reactants comprises the carbohydrate and the ammonium compound,
   the carbohydrate comprises a monosaccharide, and
   the ammonium compound comprises an ammonium salt of a carboxylic acid.

13. The method of claim 1, wherein the plurality of particles comprise sand, and wherein the Maillard reaction product forms a water-insoluble coating on the plurality of particles.

14. The method of claim 1, wherein the plurality of particles comprise sand, wherein the Maillard reaction product forms a water-insoluble coating on the plurality of particles, and wherein the water-insoluble coating of the Maillard reaction product has a thickness of about 0.1 mils to about 5 mils.

15. The method of claim 1, wherein the plurality of particles comprise sand, wherein the Maillard reaction product forms a water-insoluble coating on the plurality of particles, wherein the water-insoluble coating of the Maillard reaction product has a thickness of about 0.1 mils to about 5 mils, and wherein the plurality of particles are coated with a single layer of a coating comprising the Maillard reaction product.

* * * * *